(12) United States Patent
Koike et al.

(10) Patent No.: US 7,171,856 B2
(45) Date of Patent: Feb. 6, 2007

(54) ELECTRICAL SHIELD STRUCTURE FOR PRESSURE SENSOR

(75) Inventors: Haruhisa Koike, Kariya (JP); Hironobu Baba, Obu (JP); Nobuo Segawa, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/073,631

(22) Filed: Mar. 8, 2005

(65) Prior Publication Data

US 2005/0199070 A1    Sep. 15, 2005

(30) Foreign Application Priority Data

Mar. 12, 2004    (JP)    ............................. 2004-070061

(51) Int. Cl.
*G01L 9/12*    (2006.01)
(52) U.S. Cl. ..................................... 73/718; 361/283.1
(58) Field of Classification Search ................. 73/718, 73/724, 700; 361/283.1, 283.4
See application file for complete search history.

(56) References Cited

U.S. PATENT DOCUMENTS 5,150,275 A * 9/1992 Lee et al. ................ 361/283.4
5,442,962 A * 8/1995 Lee ............................. 73/718
6,813,953 B2   11/2004 Baba et al.

OTHER PUBLICATIONS

Notice of Preliminary Rejection from Korean Patent Office issued on Jun. 27, 2006 for the corresponding Korean patent application No. 10-2005-0020105 (a copy and English translation thereof).

* cited by examiner

*Primary Examiner*—Edward Lefkowitz
*Assistant Examiner*—Andre Allen
(74) *Attorney, Agent, or Firm*—Posz Law Group, PLC

(57) ABSTRACT

A pressure sensor includes a case having a concave portion, a sensing portion disposed in the concave portion to output an electrical signal proportional to an applied pressure, a circuit portion disposed in the concave portion and connected to the sensing portion and a conductive diaphragm fixed to the case to cover the concave portion. A conductive member surrounds the sensing portion and the circuit portion to provide an electrical shield. The diaphragm is used as a part of the conductive member.

8 Claims, 3 Drawing Sheets

ELECTRICAL SHIELD STRUCTURE FOR PRESSURE SENSOR

CROSS REFERENCE TO RELATED APPLICATION

This application is based upon and claims foreign priority of Japanese Patent Application No. 2004-70061 filed on Mar. 12, 2004, the contents of which are incorporated herein by reference.

FIELD OF THE INVENTION

The present invention relates to a pressure sensor having a diaphragm, and, more specifically, to a pressure sensor for detecting and controlling loss of pressure in a DPF (Diesel Particulate Filter).

BACKGROUND OF THE INVENTION

In recent years, DPFs have become widely used for collecting and suppressing soot and smoke, particularly from diesel engines, in accordance with regulations regarding automobile emission control.

The DPF is a filter used in an exhaust pipe to collect the soot and smoke. The collected soot on the filter is burned so that the soot will not be released during exhaust. An abnormal burn may cause breakage of the ceramic filter during burning if the amount of the soot on the filter is either too much or too little. In other words, the amount of the collected soot has to be measured precisely in order to control soot burning.

The amount of the collected soot is usually measured by the difference of pressures on both sides of the filter. The pressure loss caused by the filter becomes an indicator of the amount of soot collected on the filter. The pressure loss is captured either as a pre-filtering pressure (upstream pressure) in an absolute pressure detection method, or as a difference of pre/post filtering pressures (a difference between an upstream pressure and a downstream pressure) in a relative pressure detection method.

The pressure sensor used for the relative pressure detection method in a conventional system includes, for example, a diaphragm as a covering of a sensor element as well as a pressure receiver in a sensing portion (refer to Japanese Patent Document JP-A-2003-315193).

FIG. 3 shows a cross-sectional view of the pressure sensor used in the relative pressure detection method.

In this pressure sensor, two concave portions 11a, 11b are disposed on both sides of a case 10 with a connecting through passage. The through passage is blocked by a sensor element 20 in the concave portion 11a. The two concave portions 11a, 11b are filled with oil 70. Two conductive metal diaphragms 81, 82 cover the two concave portions 11a, 11b and seal the oil 70 therein.

In this case, an upstream side of the DPF in the exhaust pipe is, for example, connected to a pressure induction port 12a of a first port portion 12, and a downstream side of the DPF in the exhaust pipe is connected to a pressure induction port 13a of a second port portion 13 respectively through rubber hoses or the like.

Through those hoses, the pressure on the upstream side of the DPF is applied to the first diaphragm 81 in the case 10, and the pressure on the downstream side of the DPF is applied to the second diaphragm 82.

Pressure on both diaphragms 81, 82 is applied to the sensor element 20 through the oil 70, or more precisely, a difference of the pressures on the diaphragm 81 and the diaphragm 82 is received by the sensor element 20. The sensor element 20 outputs an electrical signal proportional to the difference of the applied pressures.

The sensor element 20 in the concave portion 11a and a terminal 10a disposed in the case 10 are electrically connected by a wire 40 to output the electrical signal from the sensor element 20.

However, the pressure sensor shown in FIG. 3 is susceptible to external noise such as an electromagnetic wave and, as a result, the circuit in the sensor may malfunction. The external noise, in this case from an automotive pressure sensor, includes ignition noise from the engine and the like.

The external noise causes an abnormal current in the circuit connected to the sensor element 20. That is, electrical current in the sensor element 20, the wire 40 and/or the terminal 10a suffers from bad influences such as abnormal amplification from the external noise.

Conventionally, the sensor device is shielded from the external noise by wrapping the circuit with a conductive material in order to raise noise-resistibility.

FIG. 3 specifically shows a prototype of a sensor device electrically shielded with a conventional shielding method manufactured by the inventors.

The pressure sensor is enclosed in a conductive member 500 composed of, for example, a metal case, a metal deposition film and the like, with the exception of a portion for the terminal 10a for external connection.

However, the conductive member 500 used for enclosing the pressure sensor for electrically shielding a circuit portion 10a, 40 (combination of the terminal 10a and the wire 40) requires a large number of parts because of the size, and thus increased manufacturing costs.

SUMMARY OF THE INVENTION

In view of the above-described problems, it is an object to provide a pressure sensor having a conductive diaphragm functional as a pressure receiving portion of a sensor element, and also as a part of a shield for external noise, at a low manufacturing cost.

In order to achieve the object, a pressure sensor includes a case having a concave portion, a sensing portion disposed in the concave portion for outputting an electrical signal proportional to an applied pressure, a circuit portion disposed in the concave portion and connected to the sensing portion, and a conductive diaphragm fixed to the case to cover the concave portion. The pressure sensor uses the sensing portion to detect the applied pressure to the diaphragm, and the sensing portion and the circuit portion are electrically shielded from the external noise with a surrounding conductive member. The diaphragm is used as a part of the conductive member.

The sensing portion and the circuit portion are both surrounded by the conductive member and are electrically shielded.

The conductive diaphragm is used as a part of the conductive member. As a result, manufacturing cost of the conductive member is lower than that for a sensor not using the diaphragm as a part of the conductive member.

Therefore, a circuit portion of a pressure sensor having a diaphragm for covering a sensor element as well as a pressure receiver in a sensing portion can be shielded from external noise using a low cost structure. In this case, a part of the conductive member of the pressure sensor other that the diaphragm can be made from a metal board fixed on the case.

In addition, the circuit portion of the pressure sensor includes the terminal with one end exposed in the concave portion of the case and a wire used for electrically connecting the sensing portion and the terminal.

Another feature of the pressure sensor is that the other end of the terminal protrudes from the conductive member to be connected electrically with an external circuit.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

The present invention is herein described with reference to the drawings.

[First Embodiment]

Figure 1:
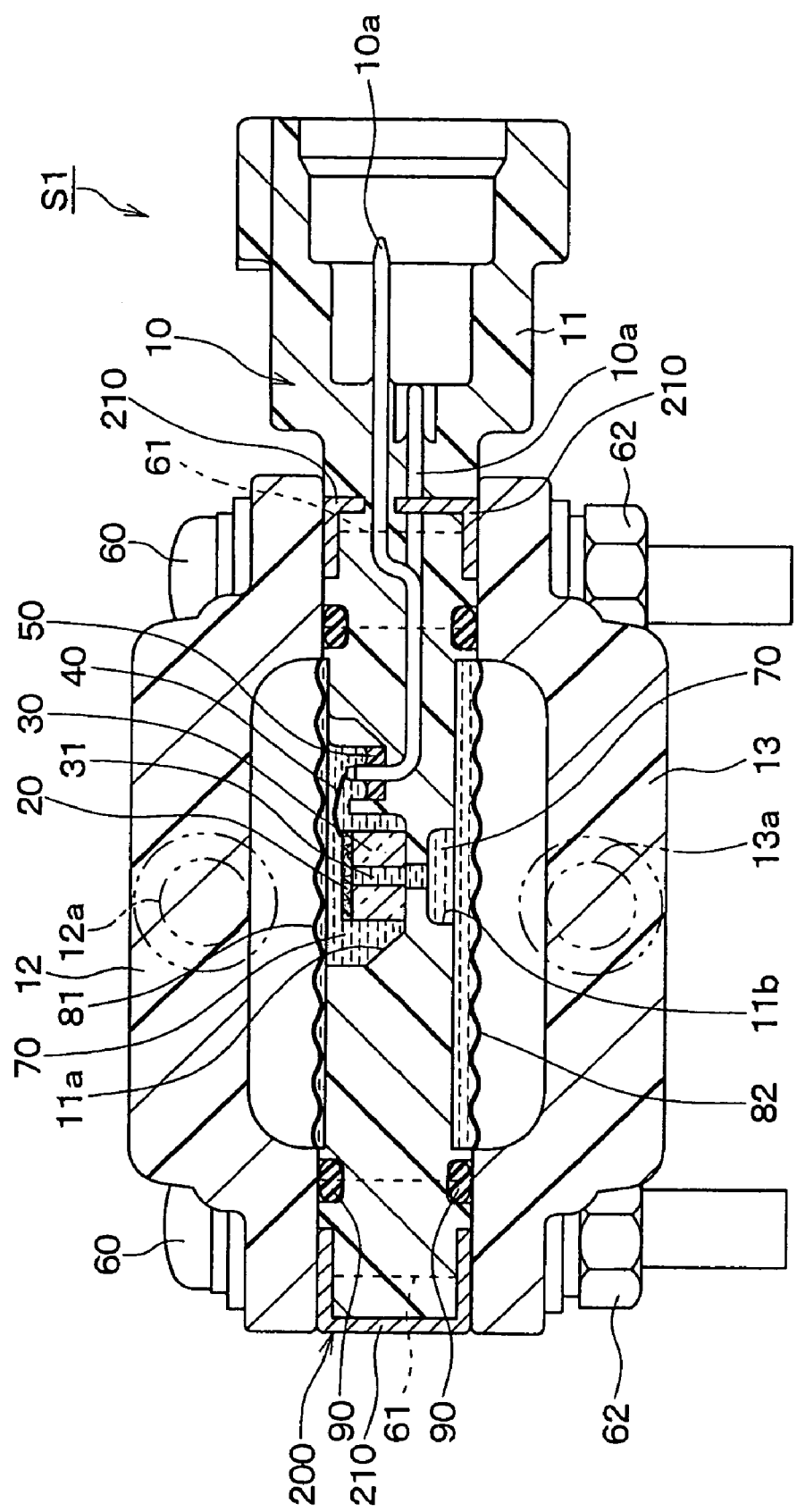
FIG. 1 is a schematic cross-sectional view of a pressure sensor used in a relative pressure detection method according to a first embodiment.

A pressure sensor S1 according to the present embodiment is shown as a schematic cross-sectional view in FIG. 1.

The present embodiment is, although not necessarily limited, applied to a pressure sensor in a DPF (Diesel Particulate Filter) disposed on an exhaust pipe of an automotive diesel engine for detecting the difference of pressures between a pre-filtering exhaust and a post-filtering one.

The pressure sensor S1 includes a case 10 as a main body. The case 10 is made of a resin type material such as PBT (Polybuthylene Terephthalete), PPS (Polyphenylene-sulphide) or the like.

The case 10 includes a connector case portion (a sensor element disposition portion) 11 having a terminal 10a as a wiring, a first port portion 12 and a second port portion 13 disposed on the connector case portion 11. The connector case portion 11 and port portions 12, 13 are all made of a resin-type material.

The connector case portion 11 of the case 10 has a first concave portion 11a on one side (an upper side in FIG. 1) and a second concave portion 11b on the other side (a lower side in FIG. 1). The concave portions are connected by a through passage. The though passage is blocked by a sensor element 20 disposed on the first concave portion 11a side for pressure detection.

The sensor element 20 is a part of a sensing portion, and outputs an electrical signal proportional to an applied pressure. The sensor element 20 in this embodiment is a semiconductor diaphragm-type sensor chip that has a diaphragm as a thin-walled part (not shown in the drawings) formed on a semiconductor substrate such as a silicon substrate or the like.

The sensor element 20 has a pedestal 30 made of glass or the like integrated thereon. The sensor element 20 is housed and fixed at the bottom of the first concave portion 11a of the connector case portion 11 with a silicon-type adhesive or the like by the interposed pedestal 30.

The pedestal 30 has a through-hole 31 that is connected to the second concave portion 11b. That is, a passage connects the second concave portion 11b with the first concave portion 11a via the through-hole 31 on the pedestal 30, which is blocked by the sensor element 20. In other words, the sensor element 20 blocks the passage to divide the first concave portion 11a and the second concave portion 11b.

The terminal 10a disposed on the connector case portion 11 as a wiring is used to output an electrical signal from the sensor element 20. The terminal 10a is shaped as a rod and composed of conductive material such as copper or the like. The terminal 10a is formed by insert molding in the connector case portion 11.

One end of the terminal 10a is exposed in the first concave portion 11a in proximity to the sensor element 20, and electrically connected to the sensor element 20 by a wire 40 made of aluminum, gold or the like. In this embodiment, the terminal 10a and the wire 40 constitute a circuit portion.

A seal 50 is used to seal a gap between the terminal 10a exposed in the first concave portion 11a and the connector case portion 11. The seal 50 is made of resin or the like.

The terminal 10a is disposed parallel to the bottom of the first concave portion 11a of the connector case portion 11, that is, a sensor element 20 disposition surface of the case 10. The opposite end of the terminal 10a with respect to the end being connected to the wire 40 is exposed from the case 10 (the connector case portion 11).

The exposed end of the terminal 10a can be connected to an external circuit. The sensor element 20 communicates with the external circuit (an automotive ECU or the like) through the wire 40 and the terminal 10a.

The connector case portion 11 is used as a sensor element disposition surface for the sensor element 20. The first port portion 12 and the second port portion 13, as shown using a chain double-dotted line in FIG. 1, have pressure induction ports 12a, 13a respectively.

The port portions 12 and 13 are attached onto the connector case portion 11 by, for example, a screw 60 and nuts 61, 62. The nut 61 is formed by insert molding a part of the connector case portion 11. The first port portion 12, second port portion 13 and the connector case portion 11 are attached by using the screws 60 and the nuts 61, and then fastened by the nuts 62. The screws 60 and the nuts 61, 62 may be replaced with rivets.

The first concave portion 11a and the second concave portion 11b of the connector case portion 11 in the case 10 are filled with oil 70. The oil may include a material such as fluorine-type oil, silicon-type oil or the like.

On the case 10, a first diaphragm 81 is disposed between the first port portion 12 and the connector case portion 11, and a second diaphragm 82 is disposed between the second port portion 13 and the connector case portion 11.

In this embodiment, the first and second diaphragms 81, 82 are composed of a conductive material such as Cr, Ni or the like to be resistant to corrosion and high temperature. The material used for the diaphragm has, for example, a pitting corrosion index (Cr+3.3Mo+20N) of 50 or greater, and contains 30% by weight of Ni. That is, the material for the diaphragms 81, 82 contains 3.3 times of Mo content and 20 times of N content in addition to one time of Cr content.

The first diaphragm 81 is, as shown in FIG. 1, is disposed as a covering of the first concave portion 11a with the oil 70 sealed therein. The second diaphragm 82 is, on the other hand, disposed as a covering of the second concave portion 11b with the oil 70 sealed therein.

Figure 2:
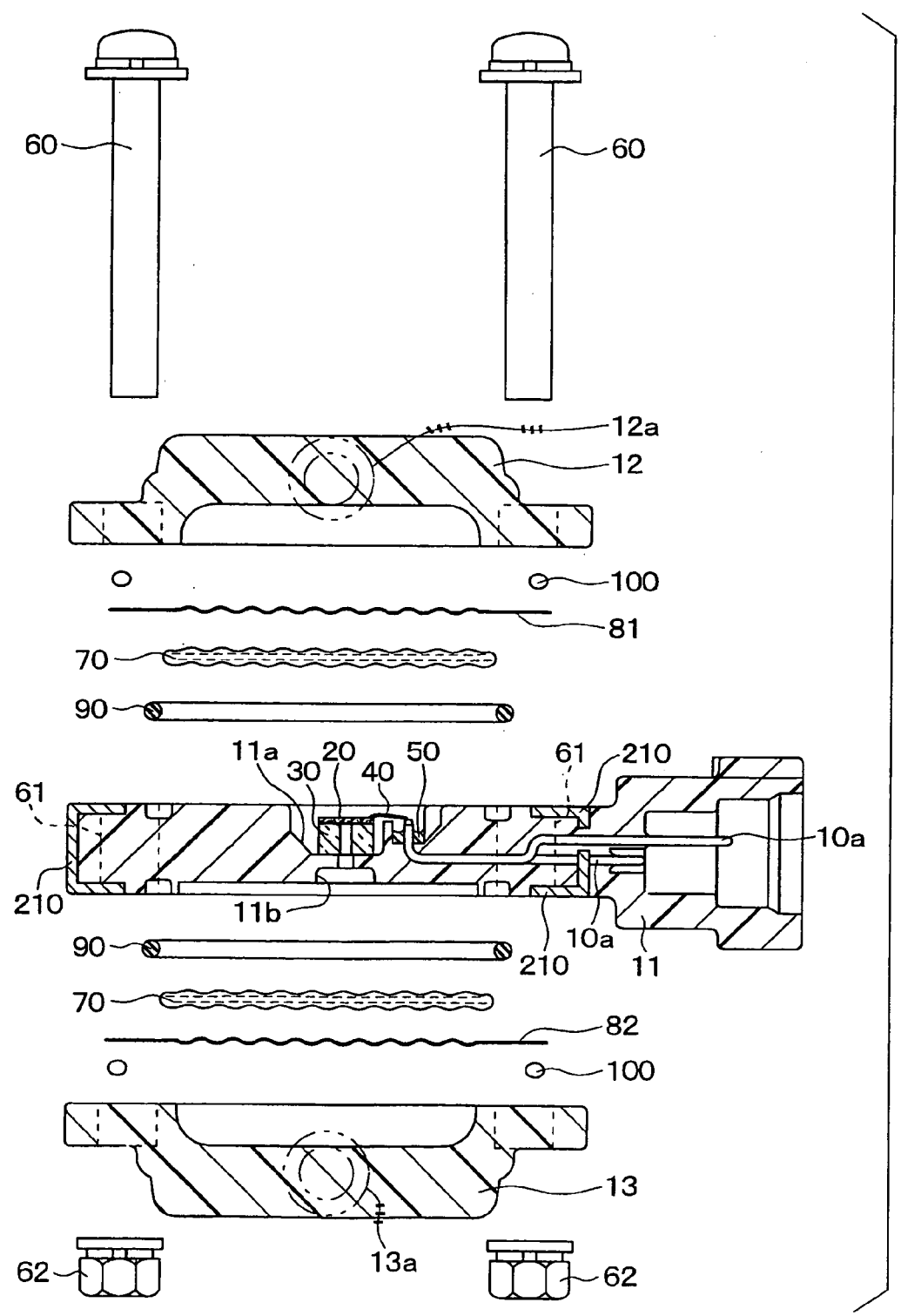
FIG. 2 is an exploded view of the pressure sensor shown in FIG. 1.
Figure 3:
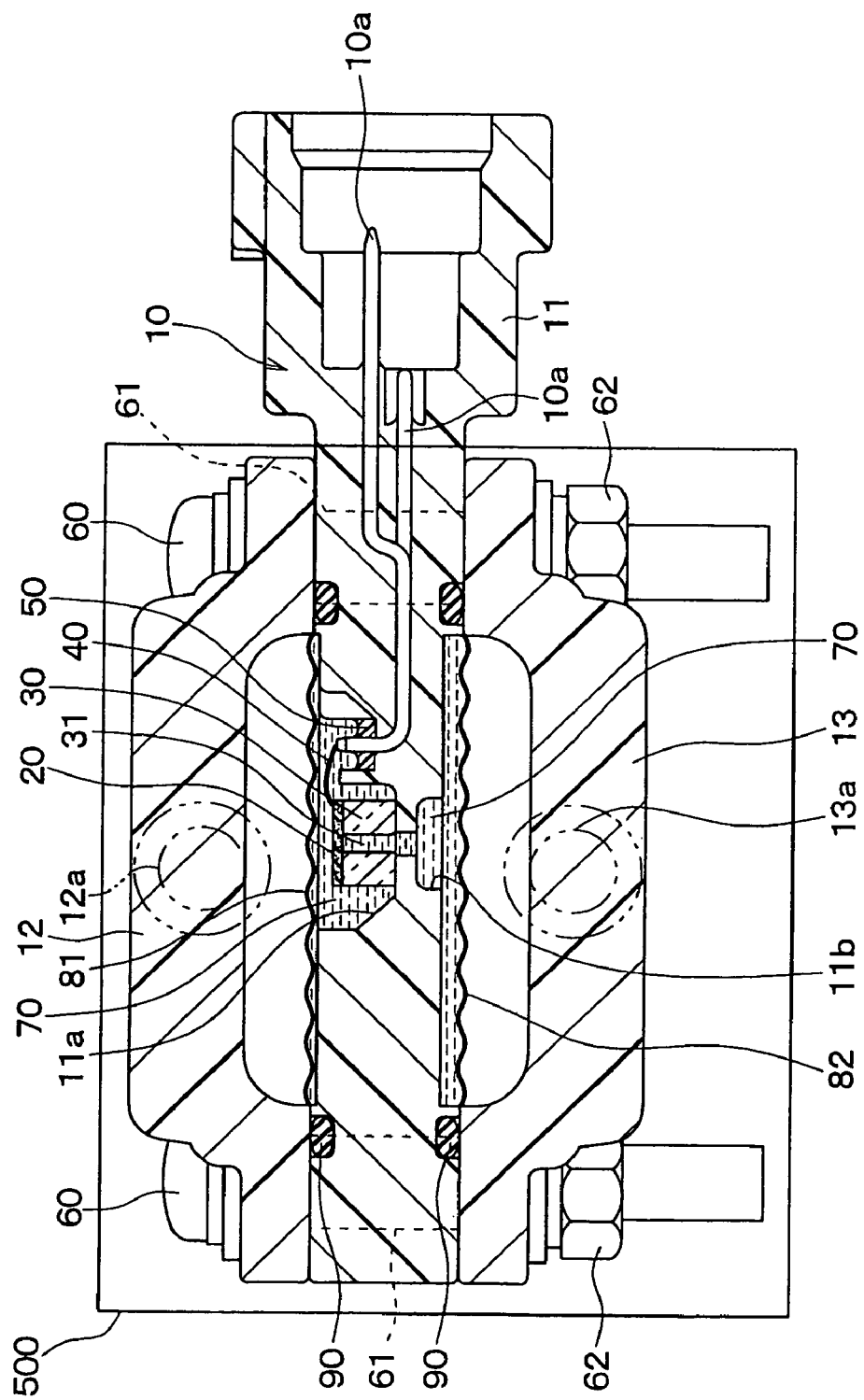
FIG. 3 is a schematic cross-sectional view of a conventional pressure sensor.

The first diaphragm 81 and the second diaphragm 82 are adhered to the first port portion 12 and the second port portion 13 respectively with a resin adhesive made of a material such as fluorosilicon-type resin or fluorine-type resin (not shown in FIG. 1). This adhesive is shown in FIG. 2 as the adhesive 100.

The connector case portion 11 has O-rings 90 disposed in the abutting portions against the first and the second diaphragm 81, 82 to tightly seal the oil 70.

The amounts of oil 70 contained in the concave portions 11a, 11b are preferably the same on both sides of the sensor element 20. That is, the amount of oil 70 in the first concave portion 11a on the first diaphragm 81 side and in the second concave portion 11b on the second diaphragm 82 side are preferably the same. This design is achieved by taking into account the capacity of concave portions and volume of parts, such as the first concave portion 11a, the second concave portion 11b, the sensor element 20 and the pedestal 30.

The upstream exhaust side with respect to the DPF is connected to the pressure induction port 12a of the first port portion 12, and the downstream side is connected to the pressure induction port 13a of the second port portion 13 respectively by rubber hoses or the like. These hoses are not shown in FIGS.

Therefore, an upstream side pressure (pre-filtering pressure) is applied to the first diaphragm 81 and a downstream side pressure (post-filtering pressure) is applied to the second diaphragm 82.

Then, the pressures applied to the first and second diaphragms 81, 82 are transmitted to the sensor element 20 through the oil 70. The sensor element 20 detects the difference of the pressures on the first diaphragm 81 side and on the second diaphragm 82 side.

In this embodiment, a sensor diaphragm (different from the diaphragms 81, 82 and not shown in FIGS.) formed on the sensor element 20 receives the DPF upstream pressure being applied from the first diaphragm 81 side on its upside, and the DPF downstream pressure being applied from the second diaphragm 82 side on its downside.

The sensor diaphragm on the sensor element 20 is bent by the difference of the upstream and downstream pressures. The sensor element 20 outputs an electrical signal based on the degree of bending through the wire 40 and the terminal 10a to the external circuit.

The pressure sensor in this embodiment is characterized with the following points.

The sensing portion having the sensor element 20 and the circuit portion having the terminal 10a and the wire 40 therein are electrically shielded by a surrounding conductive member 200 as shown in FIG. 1. The diaphragms 81, 82 are incorporated as part of the conductive member 200.

The terminal 40 has two ends, one end of which is connected to the wire 40, the other end being exposed in the connector case portion 11 and protruding from the conductive member 200.

The conductive member 200, as shown in FIG. 1, covers the outer surface of the connector case portion 11 of the case 10, except for an area being used to expose the terminal 10a.

The conductive member 200, with the exception of the diaphragms 81, 82, is composed of a metal board 210 fixed on the connector case portion 11 of the case 10. The metal board 210 uses a thin board made of a material such as copper, iron or the like. The metal board 210 may be as thin as a foil. In this embodiment, the metal board 210 is manufactured by insert molding together with the terminal 10a on the connector case portion 11.

The metal board 210 covers the outer surface of the connector case portion 11 except for the area being covered by the diaphragms 81, 82. Edges of the metal board 210 and edges of the diaphragms 81, 82 overlap and connect electrically. The metal board 210 is arranged so that it does not interfere with the screws 60 and nuts 61, 62.

The metal board 210 has a hole for the terminal 10a in an area being buried in the connector case portion 11, as shown on the right side of FIG. 1. The metal board 210 and the terminal 10a are separated and are electrically insulated by an interposed resin.

The metal board 210 and the terminal 10a may be securely insulated by, for example, a feed through capacitor (not shown in FIGS.) disposed in the hole of the metal board 210 that permits the terminal 10a to protrude therefrom. The terminal 10a and the feed through capacitor are bonded by a solder. In this embodiment, the metal board 210 is formed by insert molding on the connector case portion 11. However, the metal board 210 may be fixed on the connector case portion 11 by other suitable methods.

For example, a part of the connector case portion 11 surrounded by the conductive member 200 may only be formed with the terminal 10a by integral molding using resin, and the conductive member 200 is attached thereon.

This molded part is further molded with resin to form a wall around the exposed terminal 10a to complete the connector case portion 11 being surrounded by the metal board 210, as shown in FIG. 1. The metal board 210 on the left side in FIG. 1 may be adhered using an adhesive.

A manufacturing method of the pressure sensor S1 is now explained with reference to FIG. 1 and FIG. 2. FIG. 2 is an exploded view of the pressure sensor shown in FIG. 1.

First, the terminal 10a and nut 61 are formed by insert molding. The connector case portion 11 has the metal board 210 fixed on the outer surface. One end of the terminal 10a exposed in the first concave portion 11a of the connector case portion 11 is sealed by the seal 50.

Then, the sensor element 20 being combined with the pedestal 30 is adhered and fixed to the first concave portion 11a of the connector case portion 11. The sensor element 20 and the terminal 10a are electrically connected by wire-bonding.

Next, the first diaphragm 81 is adhered to the first port portion 12 with the adhesive 100. The first concave portion 11a of the connector case portion 11 is filled with the oil 70. The O-ring 90 is placed on the connector case portion 11.

Next, the oil 70 is sealed in a process that combines the connector case portion 11 and the first port portion 12 with the screws 60 and the nuts 61 in vacuum. The connector case portion 11 and the first port portion 12 are fastened tightly with the screws 60 while paying close attention to preventing bubbles in the oil 70 during the assembly process.

Next, the second port portion 13 and the connector case portion 11 are combined in the same manner as the first port portion 12 while having the second diaphragm 82, the oil 70 and the O-ring 90 in between in vacuum. Adjustment and inspection steps complete a manufacturing process of the pressure sensor S1 shown in FIG. 1.

In this embodiment, the pressure sensor includes a case 10 with a concave portion 11a, a sensing portion 20 disposed in the concave portion 11a for outputting an electrical signal proportional to an applied pressure, a circuit portion 10a, 40 disposed in the concave portion 11a and connected to the sensing portion 20, and a conductive diaphragm 81 fixed to the case 10 to cover the concave portion 11a. A pressure applied to the diaphragm 81 is received by the sensor element 20. The sensor element 20 and the circuit portion 10a, 40 are electrically shielded with the surrounding conductive member 200. The pressure sensor S1 is characterized by the diaphragm 81 being used as a part of the conductive member 200.

In this embodiment, the conductive member 200 of the pressure sensor S1 uses the second diaphragm 82 on the second concave portion 11b as well as the first diaphragm 81 as a part of the conductive member 200.

In this structure, the sensor element 20 and the circuit portion 10a, 40 are electrically shielded in an appropriate manner with the surrounding conductive member 200.

The conductive diaphragms 81, 82 are used as a part of the conductive member 200. This structure is beneficial in terms of the manufacturing cost compared to a structure that uses a separate conductive member to shield the sensor element 20 and the circuit portion 10a, 40.

In other words, the metal diaphragms 81, 82 that cover a large portion of the pressure sensor substantially decrease the amount of the metal board 210 required to cover the rest of the pressure sensor body as well as being functional as diaphragms.

Therefore, in this embodiment, the pressure sensor with the sensor element 20 detecting the applied pressure through the conductive diaphragm 81 is sealed from external noise by using an inexpensive structure that encloses the sensing portion and the circuit portion 10a, 40. As a result, the pressure sensor S1 is manufactured as high external noise resistibility device.

The pressure sensor S1 in this embodiment uses the metal board 210 fixed on the case 10 as the conductive member 200 in the area that is not covered by the diaphragms 81, 82.

Further in this embodiment, the circuit portion 10a, 40 includes the terminal 10a as a wire having one end exposed in the concave portion 11a in the case 10, and the wire 40 that electrically connects the sensor element 20 and the terminal 10a. The other end of the terminal 10a is prepared as a terminal used for an external wire connection.

In the structure of this embodiment, the pressure sensor S1 with the terminal 10a protruding from the conductive member 200 suitably prepares the pressure sensor to be accessible from an external circuit without causing deterioration of the electrical shield.

[Other Embodiment]

The embodiment described above uses the metal board 210 being fixed on the case 10, other than the diaphragms 81, 82, as a part of the conductive member 200. However, the metal board 210 may be substituted by other parts.

For example, the metal board 210 may be substituted with a part such as a metal film formed in a powder coating method, a metal deposition method or the like, or with a conductive thick film-type paste for circuit wiring made of a material such as copper (Cu), silver (Ag) or the like.

Further, a conductive resin or the like may be used as a member to construct the conductive member 200, other than the above-mentioned metals.

The circuit portion in the first embodiment includes the terminal 10a and the wire 40. However, a circuit chip may also be included in the circuit portion if, for example, a circuit chip being connected to the sensor element 20 is disposed in the first concave portion 11a.

Further, an integrated sensor chip having a circuit for sensor signal processing formed by a semiconductor process or the like may be used as a sensor chip that composes the sensor element 20. In this case, the circuit on the integrated sensor chip is considered as a part of the circuit portion.

In the first embodiment, the pressure induction port 12a of the first port portion 12 is connected to the DPF upstream side of the exhaust pipe and the pressure induction port 13a of the second port portion 13 is connected to the DPF downstream side of the exhaust pipe respectively with rubber hoses or the like. The DPF upstream pressure (pre-filtering pressure) is, thus, applied to the first diaphragm 81 and the DPF downstream pressure (post-filtering pressure) is applied to the second diaphragm 82.

The structure described above may be switched to introduce the DPF downstream pressure (post-filtering pressure) to the first diaphragm 81 and the DPF upstream pressure (pre-filtering pressure) to the second diaphragm 82 in the difference detection type pressure sensor.

Although the present invention has been fully described in connection with the preferred embodiments thereof with reference to the accompanying drawings, it is to be noted that various changes and modifications will become apparent to those skilled in the art.

For example, the present invention may be applied to an absolute pressure detection sensor, as well as a relative pressure detection sensor described in the first embodiment. An absolute pressure detection sensor typically omits the second concave portion 11b and the second diaphragm 82 from the structure shown in FIG. 1. In this case, the DPF upstream pressure (pre-filtering pressure) is received for measurement.

Further, the pressure sensor in the present invention may be used for the purpose other than the DPF pressure loss detection in the exhaust pipe.

Such changes and modifications are to be understood as being within the scope of the present invention as defined by the appended claims.

What is claimed is:

1. A pressure sensor comprising:
    a case having a concave portion;
    a sensing portion disposed in the concave portion, the sensor portion including a diaphragm part deformable in accordance with an applied pressure, the sensing portion outputting an electrical signal proportional to the applied pressure;
    a circuit portion disposed in the concave portion and connected to the sensing portion; and
    a conductive diaphragm fixed to the case to cover the concave portion,
    wherein a conductive member surrounds the sensing portion and the circuit portion to provide an electrical shield, wherein the conductive diaphragm is used as a part of the conductive member
    wherein the sensing portion is electrically insulated from the conductive member and the conductive diaphragm.

2. The pressure sensor of claim 1, wherein the conductive member comprises the conductive diaphragm and a metal board fixed on the case.

3. The pressure sensor of claim 1, wherein the circuit portion includes a terminal disposed in the concave portion, wherein a first end of the terminal is exposed in the concave portion, wherein a wire electrically connects the sensing portion with the terminal.

4. The pressure sensor of claim 3, wherein the terminal has a second end that protrudes from the conductive member to provide an external electrical connection.

5. The pressure sensor according to claim 1, wherein the conductive diaphragm is located at two opposite sides of the sensing portion.

6. The pressure sensor according to claim 1, further comprising a housing for receiving at least a part of the case, the housing having a pressure introduction hole for introducing a pressure to be applied, wherein the conductive diaphragm is inserted between the case and the housing.

7. The pressure sensor according to claim 2, wherein the metal board has a side plate extending on a surface of the case in a direction approximately perpendicular to an extending direction of the conductive diaphragm.

8. The pressure sensor according to claim 2, wherein the metal board is bent at a corner of the case.

* * * * *